(12) United States Patent
Tao et al.

(10) Patent No.: US 8,553,269 B2
(45) Date of Patent: Oct. 8, 2013

(54) IMAGE FORMING APPARATUS AND COMPUTER-READABLE RECORDING MEDIUM STORING IMAGE FORMING PROGRAM FOR ALLOWING STORAGE SECTION TO STORE REPEATING USE INSTRUCTION INFORMATION FOR REPEATEDLY USING BAND DATA

(75) Inventors: Kozo Tao, Osaka (JP); Masaki Kikuchi, Osaka (JP); Shinichi Hashimoto, Osaka (JP); Norifumi Miyahara, Osaka (JP); Yoshiteru Nishikawa, Osaka (JP); Takashi Murakami, Osaka (JP); Hiromi Yamagami, Osaka (JP)

(73) Assignee: Kyocera Mita Corporation (JP)

( * ) Notice: Subject to any disclaimer, the term of this patent is extended or adjusted under 35 U.S.C. 154(b) by 1251 days.

(21) Appl. No.: 12/034,877

(22) Filed: Feb. 21, 2008

(65) Prior Publication Data

US 2008/0204806 A1    Aug. 28, 2008

(30) Foreign Application Priority Data

Feb. 27, 2007  (JP) ................................. 2007-047418

(51) Int. Cl.
*G06K 15/00*    (2006.01)
(52) U.S. Cl.
USPC ....................................... 358/1.16
(58) Field of Classification Search
USPC ............................... 358/1.15, 1.16
See application file for complete search history.

(56) References Cited

U.S. PATENT DOCUMENTS

| 5,129,049 A | | 7/1992 | Cuzzo et al. |
| 5,822,504 A | * | 10/1998 | Ishibashi et al. ............. 358/1.11 |
| 5,960,165 A | | 9/1999 | Kakuno et al. |
| 6,009,242 A | * | 12/1999 | Anzai ........................... 358/1.15 |
| 6,128,096 A | * | 10/2000 | Furuya et al. ................ 358/1.17 |

FOREIGN PATENT DOCUMENTS

| EP | 0 820 034 | 1/1998 |
| JP | 9272231 | 10/1997 |
| JP | 10-67147 | 3/1998 |
| JP | 10-240468 | 9/1998 |
| JP | 2000168150 | 6/2000 |
| JP | 2000-225735 | 8/2000 |

* cited by examiner

*Primary Examiner* — Benny Q Tieu
*Assistant Examiner* — Sunil Chacko
(74) *Attorney, Agent, or Firm* — Gerald E. Hespos; Michael J. Porco; Matthew T. Hespos

(57) ABSTRACT

A controller (3) controls band data generating of a band data generating section (2), band data storing of the storage section (4), print image producing of the print image producing section (5), and printing of the printing section (6). The controller (3) allows the storage section (4) to store repeating use instruction information indicating that previous band data is to be repeatedly used when the newly generated band data to be stored in the storage section (4) is identical to the previous band data. The controller (3) allows the image producing section (5) to produce a print image by using expanded data of previous band data in place of expanded data of band associated with the repeating use instruction information stored in the storage section (4).

4 Claims, 6 Drawing Sheets

FIG.2

| d11 | d12 | d13 | d14 |
| --- | --- | --- | --- |
| d21 | d22 | d23 | d24 |
| d31 | d32 | d33 | d34 |
| d41 | d42 | d43 | d44 |
| d51 | d52 | d53 | d54 |

IMAGE

AFTER DIVIDED INTO BANDS

IMAGE FORMING APPARATUS AND COMPUTER-READABLE RECORDING MEDIUM STORING IMAGE FORMING PROGRAM FOR ALLOWING STORAGE SECTION TO STORE REPEATING USE INSTRUCTION INFORMATION FOR REPEATEDLY USING BAND DATA

BACKGROUND OF THE INVENTION

1. Field of the Invention

The present invention relates to an image forming apparatus and a computer-readable recording medium storing an image forming program. More particularly, it relates to a technology of forming a print image (actual image data) from band data generated by dividing image data of a print job into bands each having a predetermined band size.

2. Description of the Related Art

Conventionally, there has been known image forming apparatuses having a printing function, such as a printer, a copying machine, a facsimile machine, and a complex machine having functions of those, have been known in which a print job for one page is divided into a plurality of bands temporarily, and the divided bands are compressed to be intermediate codes and accumulated in a memory area, and then an image printing processing of expanding the accumulated intermediate codes into bit images is executed for each page, so that the memory area can be saved.

However, in this kind of image forming apparatus, since a print job for one page is divided into a plurality of virtual bands extending in one direction, and intermediate codes for the virtual bands are generated and accumulated, it would be necessary that a user changes a direction of a sheet cassette when a sheet direction set in a print job is not matching with a direction of a sheet stored in a sheet feeding cassette. Therefore, it has been likely that an operation becomes cumbersome.

Therefore, an image forming method for forming an image including steps of generating intermediate codes based on a print job for virtual bands each having a predetermined width, accumulating the intermediate codes, and then deploying the accumulated intermediate codes into bit images for respective virtual bands has been proposed in which the intermediate codes are generated in rectangular blocks, and the plurality of rectangular blocks are arranged in any of a lengthwise direction and a widthwise direction in an image forming area to produce a virtual band. When the lengthwise direction and the widthwise direction of the image forming area are changed, a direction of generating bit images of the intermediate codes of the rectangular blocks is inversed lengthwisely and widthwisely to produce a virtual band which extends in a direction which is lengthwisely and widthwisely inversed (the directions after the lengthwise and widthwise directions are changed). Accordingly, the image forming apparatus meets changes of size and directions of the image forming area in a flexible manner (for example, refer to Japanese Patent Unexamined Publication No. H10-67147).

Further, there has been proposed a printing control apparatus in which (1) image data which is expanded from compressed image data and other image data are expanded in a band memory, and the image data expanded in the band memory is transferred to a video transfer section when a first determining section for determining whether or not an observed band is a single compressed image determines that an observed band is not a single compressed image, and (2) compressed image data is outputted to the video transfer section without deploying the image data which is expanded from the compressed image data in the band memory when the first determining section determines that the observed band is a single compressed image (for example, refer to Japanese Patent Unexamined Publication H10-240468).

However, conventional methods relying on the image forming method of generating intermediate codes from a print job for virtual bands each having a predetermined width and accumulating the intermediate codes has a problem that generating the intermediate codes for the virtual bands from a print job is likely to cause a size of a software to be large (likely to make a processing be complexed) and lower a processing speed.

SUMMARY OF THE INVENTION

The present invention was made to solve the above-described problem, and its object is to make a processing speed be higher than that of a manner while making a size of software necessary for a printing processing be small.

In summary, the present invention includes an image forming apparatus comprising: a band data generating section for generating image data of each page of a print job as band data, the band data including divisions each having a predetermined size; a storage section for storing the band data; a print image producing section for producing a print image from the band data stored in the storage section; a printing section for printing the print image produced by the print image producing section onto a sheet; a controller for controlling the band data generating of the band data generating section, the band data storing of the storage section, the print image producing of the print image producing section, and the printing of the printing section, wherein the controller allows the storage section to store repeating use instruction information indicating that previous band data is to be repeatedly used in place of newly generated band data when the newly generated band data of the image data is identical to the previous band data stored in the storage section, and the controller allows the image producing section to produce a print image by using expanded data of previous band data in place of expanded data of band associated with the repeating use instruction information stored in the storage section.

These and other objects, features and advantages of the present invention will become more apparent upon reading of the following detailed description along with the accompanied drawings.

BRIEF DESCRIPTION OF THE DRAWINGS

FIG. 2 schematically shows a configuration of band data generated in the image forming apparatus.

DETAILED DESCRIPTION OF THE PREFERRED EMBODIMENTS

Hereinafter, an embodiment of the present invention will be described in detail with reference to the drawings. It should be understood that the present invention is not limited to the following embodiment, and a configuration can be modified as needed within a range not departing from spirit of the present invention.

Figure 1:
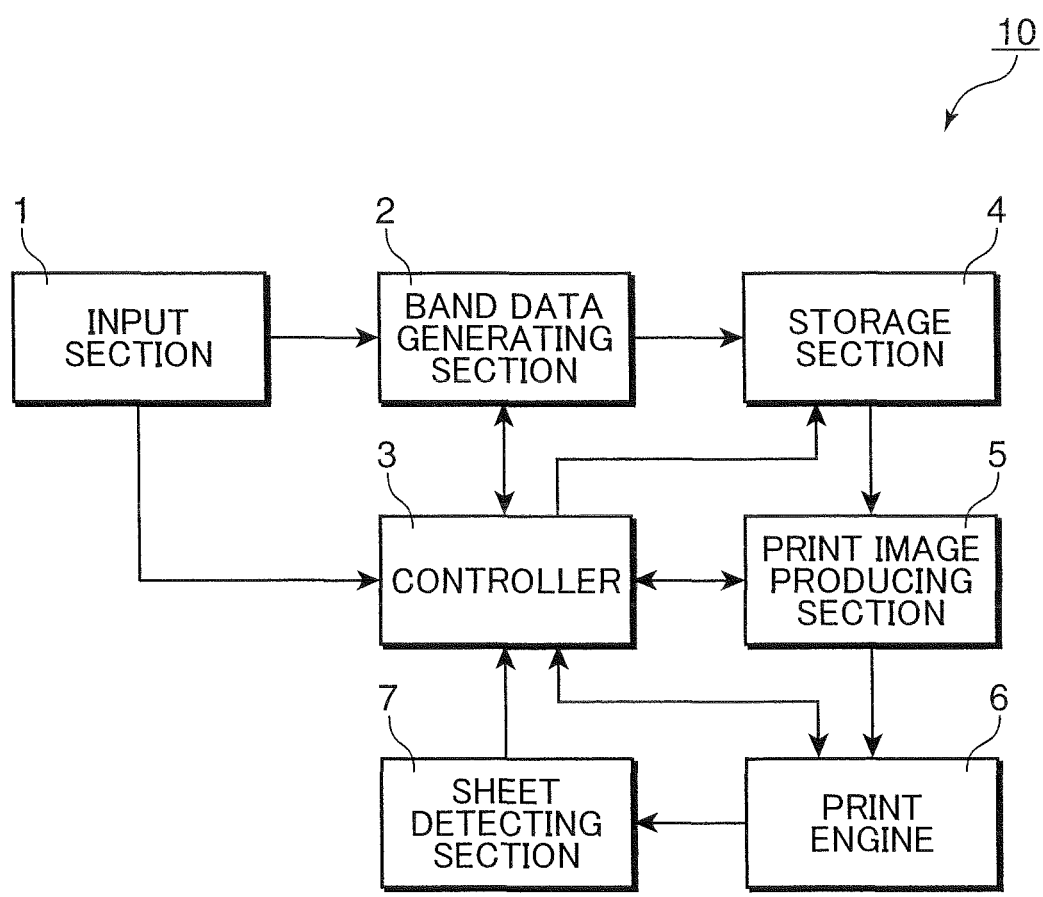
FIG. 1 is a block diagram showing a configuration of an image forming apparatus in accordance with an embodiment of the present invention.

An image forming apparatus 10 shown in FIG. 1 for example is an embodiment of the present invention. The image forming apparatus 10 includes an image forming apparatus having a printing function, such as a printer, a copying machine, a facsimile machine, and a complex machine having functions of those, and is provided with an input section 1, a band data generating section 2, a controller 3, a storage section 4, a print image producing section 5, a printing section 6, and a sheet detecting section 7, and the like.

The input section 1 has an input port for inputting a print job from an external computer in case of a printer, and a function for inputting a print job read with an optical system in case of a copying machine.

The band data generating section 2 is connected to the input section 1. The band data generating section 2 analyzes a print job inputted through the input section 1 and generates image data including a bit image for one page. Further, the band data generating section 2 generates band data divided into predetermined rectangular blocks (for example, bands of square blocks) and outputs the generated band data to the storage section 4.

As shown in FIG. 2, the band data generated by the band data generating section 2 includes squares all having the same area. For example, in the case where an image area for one page is so arranged as to be lengthwisely long as shown in FIG. 2, the band data generating section 2 sequentially constructs band data in the order of band data d11, d12, d13, d14, band data d21, d22, d23, d24, band data d31, d32, d33, d34, band data d41, d42, d43, d44, and band data d51, d52, d53, d54 from the uppermost part.

Further, the band data generating section 2 outputs to the controller 3 sheet specifying information obtained by analyzing a print job (for example, sheet size and sheet setting direction), and creates an address storage table showing the arrangement of the band data like the one shown in FIG. 2 and outputs storage management information of the band data in the storage section 4 to the controller 3 in a form of the address storage table, as will be described hereinafter.

The storage section 4 is connected to the band data generating section 2 and the controller 3. The storage section 4 is a memory which is controlled by the controller 3 to sequentially store, for example, the band data d11, d12, d13, d14, the band data d21, d22, d23, d24, the band data d31, d32, d33, d34, the band data d41, d42, d43, d44, and the band data d51, d52, d53, d54 generated by the band data generating section 2.

The print image producing section 5 is connected to the controller 3 and the storage section 4. The print image producing section 5 is controlled by the controller 3 to read, for example, each of the band data d11, d12, d13, d14, the band data d21, d22, d23, d24, the band data d31, d32, d33, d34, the band data d41, d42, d43, d44, and the band data d51, d52, d53, d54 from the storage section 4, produces print data for one page, and outputs the print data to the printing section 6.

Figure 3A:
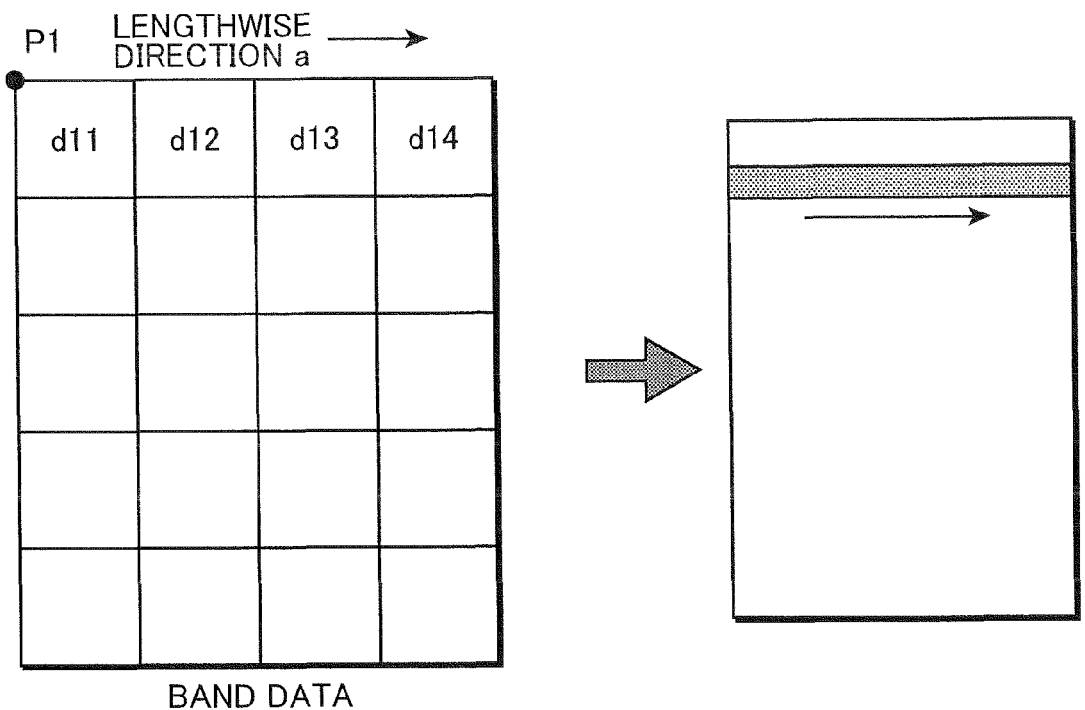
FIG. 3A schematically shows a state of expanding band data in the image forming apparatus.

In other words, when the controller 3 gives information (sheet setting information which will be described hereinafter) that, for example, a sheet is so placed as to be lengthwisely long (sheet-feeding direction "a"), the print image producing section 5 sequentially reads from a point P1 in the order of the band data d11, d12, d13, d14, and similarly, in the order of the band data d21, d22, d23, d24, the band data d31, d32, d33, d34, the band data d41, d42, d43, d44, and the band data d51, d52, d53, d54 as shown in FIG. 3A, produces a print image (bitmap data) for one page, and outputs the print image to the printing section 6. The drawing depicted in the right part of FIG. 3A shows a direction of deploying the band data.

Figure 3B:
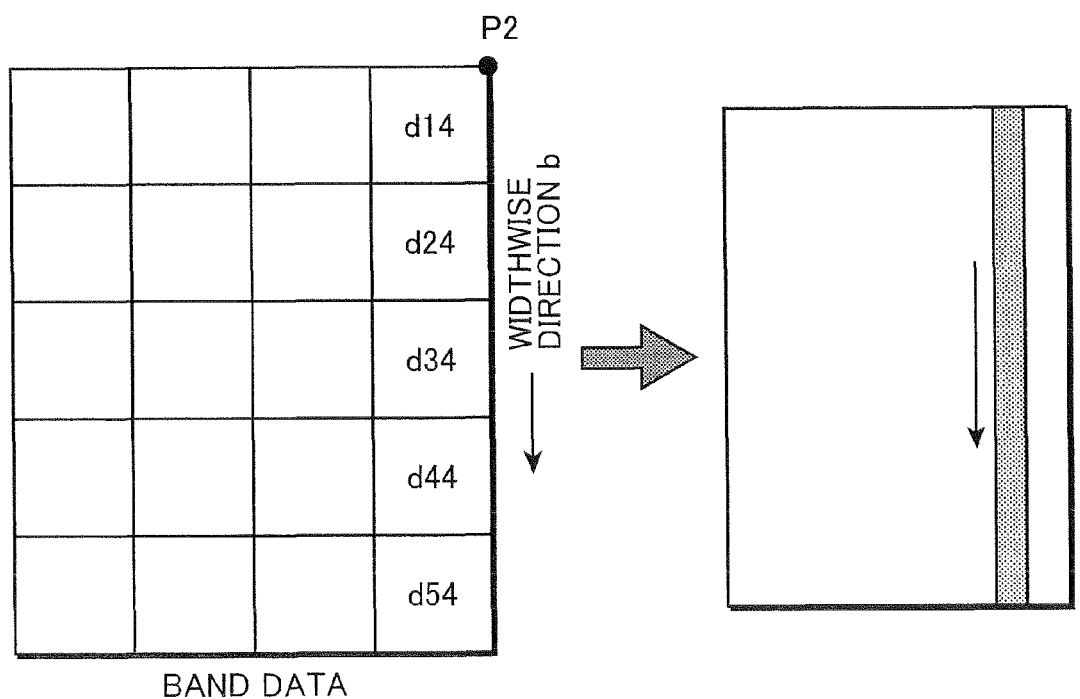
FIG. 3B schematically shows another state of expanding band data in the image forming apparatus.

Further, when the controller 3 gives information (sheet setting information which will be described hereinafter) that, for example, a sheet is placed to be widthwisely long (sheet-feeding direction "b"), the print image producing section 5 sequentially reads from a point P2 in the order of the band data d14, d24, d34, d44, d54, and similarly, in the order of the band data d13, d23, d33, d43, d53, the band data d12, d22, d32, d42, d52, and the band data d11, d21, d31, d41, d51 as shown in FIG. 3B, produces a print image for one page, and outputs the print image to the printing section 6. The drawing depicted in the right part of the FIG. 3B shows a direction of deploying the band data.

Herein, when the controller 3 gives information that a sheet is so placed as to be widthwisely long (sheet feeding "widthwise direction b"), the print image producing section 5 produces a print image by applying a rotation processing of rotating, for example, 90 degrees to each of the band data d11 through d54 on a two-dimensional coordinate space. In particular, for example, when bit data is represented by coordinates of (a, b), a processing of converting the coordinates to be (−b, a) with 90 degrees rotation may be executed by a software.

Further, the printing section 6 is connected to the controller 3 and the print image producing section 5. The printing section 6 has a structure of transferring and developing a print image for one page from the print image producing section 5 onto a transfer drum or the like, and transferring and fixing the print image based on the setting information onto a sheet fed from a sheet-feeding cassette under control by the controller 3.

The sheet detecting portion 7 is connected to the controller 3 and the printing section 6. The sheet detecting portion 7 is adapted to detect presence or absence of a sheet in the sheet-feeding cassette in the printing section 6 and a direction of the sheet, and outputs sheet detection information as a detection result to the controller 3.

Figure 4:
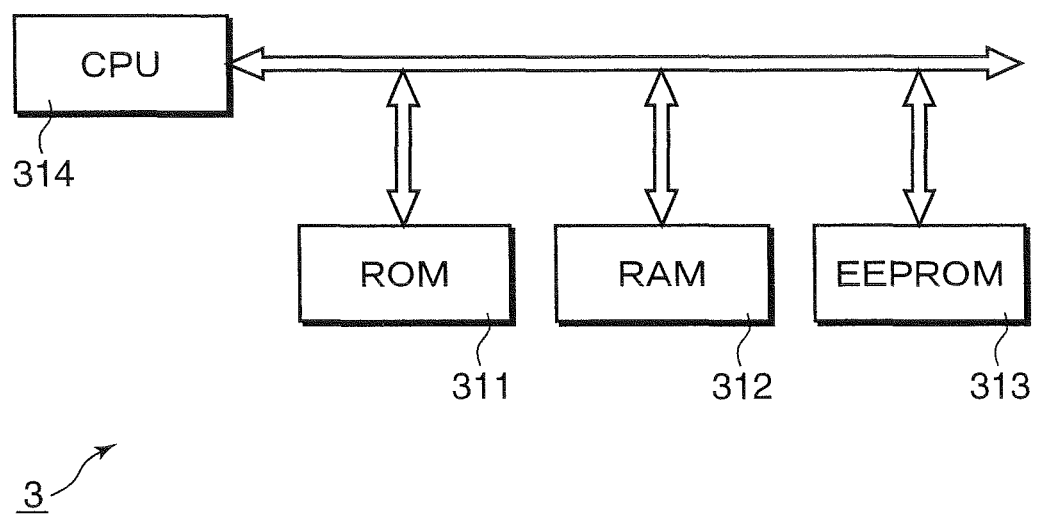
FIG. 4 is a block diagram showing a schematic configuration of a controller in the image forming apparatus.

The controller 3 is connected to the input section 1. The controller 3 controls the whole apparatus in accordance with predetermined instruction information inputted through an unillustrated operation display device and the like and a detection signal transmitted from various sensors which are provided at respective portions of the apparatus. As shown in FIG. 4, the controller 3 is provided with, for example, a ROM 311, a RAM 312, an EEPROM (Electrically Erasable Programmable ROM) 313, a microcomputer 314, and the like. The ROM 311 stores a control program for controlling the image forming apparatus 10. The RAM 312 temporarily stores data. The EEPROM 313 stores various setting data which are renewable. The microcomputer 314 reads the control program and the like from the ROM 311 and executes the control program.

The controller 3 controls generating of image data and band data in the band data generating section 2 described above, writing and reading of the band data in the storage section 4, producing of a print image based on the sheet cassette information in the band data generating section 2, and the like.

Further, when sheet specifying information of a print job matches with sheet detection information transmitted from the sheet detecting portion 7, the controller 3 controls producing of a print image in the band data generating section 2 in accordance with the sheet specifying information. When the sheet specifying information does not match with the sheet detection information, and further a sheet whose direction is inversed lengthwisely and widthwisely is not even set so that printing cannot be performed, the controller 3 allows an unillustrated display portion to display an error message which notifies a use to set a sheet whose lengthwise and widthwise directions are matching with that of the sheet specifying information, and thereafter determines whether or not printing can be started (which will be described hereinafter).

Further, when sheet specifying information obtained from the print job instructs a rotation collating function of printing sheets having the same size in lengthwise and widthwise directions alternately or allowing the rotation collating function, the controller 3 refers to the sheet specifying information to execute a rotation conversion processing of the above-described bit data in the band data generating section 2, so that the rotation collating function is realized.

Various mechanisms led by the controller 3 and executed in the band data generating section 2, the storage section 4, and the print image producing section 5 can be realized with use of an image forming program (i.e. software) in accordance with an embodiment of the present invention.

In this image forming apparatus 10, the controller 3 normally allows the image generating section 2 to compress bit image data and store the same into the storage section 4. However, when the bit image data is data which is identical to previous band data, the controller 3 controls operation of the image generating section 2 so that information indicating repeating use of band data is stored without storing the compressed bit image data.

The print image producing section 5 produces a print image based on band data stored and accumulated in the storage section 4. The print image producing section 5 normally applies an expansion processing to bit image data compressed and stored in the storage section 4 to expand the bit image data in a buffer. However, in the case of information indicating repeating use of band data, the print image producing section 5 does not apply an expansion processing to the compressed bit image data but uses the buffer of the print image producing section 5 transfers the previous bit image data which is already expanded directly to the printing section so as to use the same.

Figure 5:
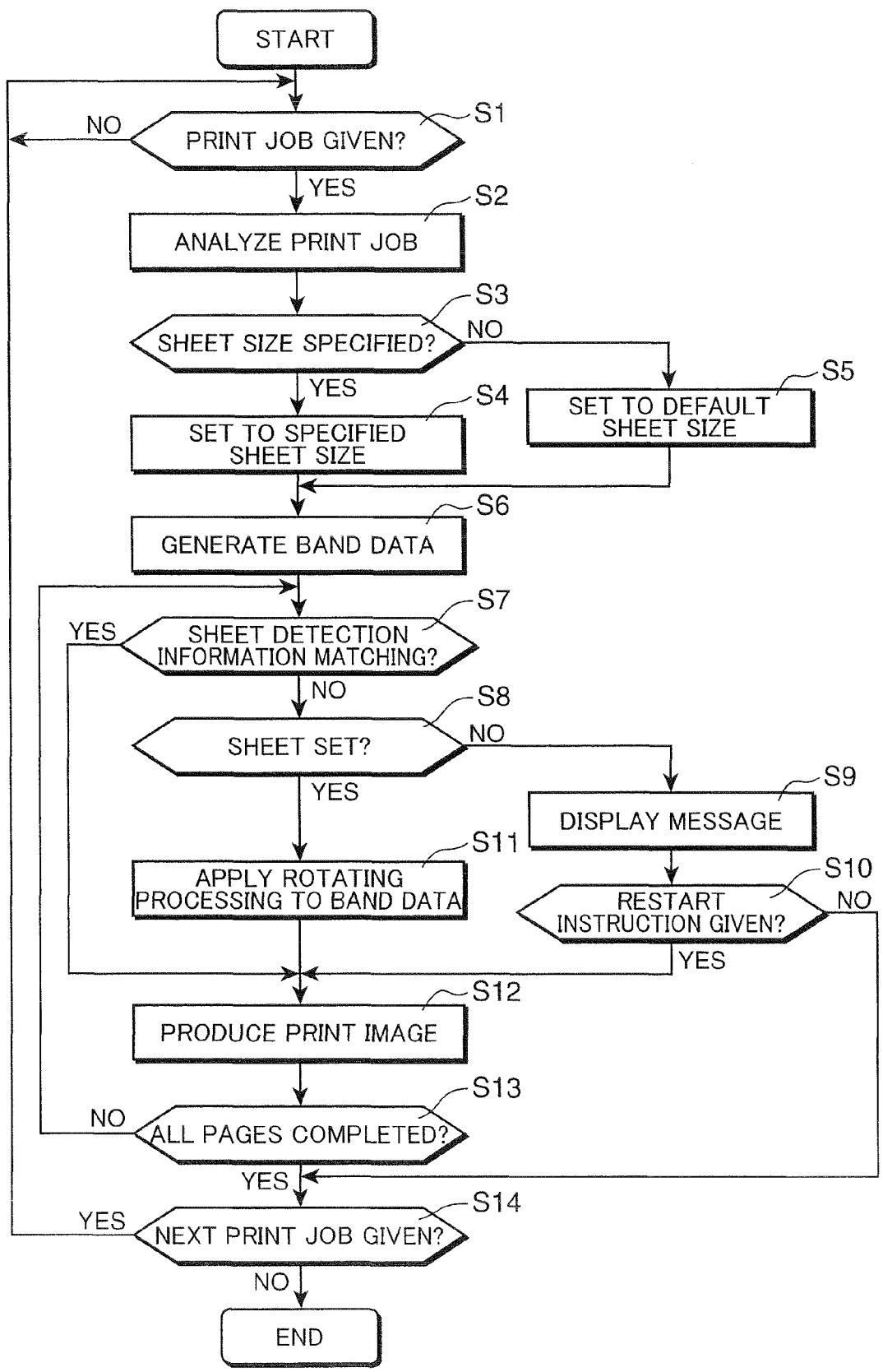
FIG. 5 is a flowchart showing steps of control executed in the case where the image forming apparatus is operated as a page printer.

Next, a control of allowing the image forming apparatus 10 to operate as a page printer will be described. The controller 3 of the image forming apparatus 10 reads a control program from the ROM 311 and executes a control of allowing the image forming apparatus 10 to operate as a page printer by following the steps shown in, for example, the flowchart of FIG. 5.

In other words, when the controller 3 starts the control of allowing the image forming apparatus 10 to operate as a page printer, it firstly determines presence or absence of a print job (step S1). When the determination result is NO, in other words, when a print job is not given, the controller 3 repeats the determination processing of step S1 and waits until a print job is inputted.

Then, when a determination result of the determination processing in step S1 is YES, in other words, a print job is given, the controller 3 analyzes the print job (step S2) and then determines a sheet size is specified in the print job (step S3).

Then, when a determination result of the determination processing in step S3 is YES, in other words, a sheet size is specified, the controller 3 sets sheet setting information for the print image producing section 5 to be a specified sheet size (step S4). Further, when the determination result of the determination processing in step S3 is NO, in other words, a sheet size is not specified, the controller 3 sets sheet setting information for the print image producing section 5 to be a default sheet size which is set in advance (step S5).

Figure 6A:
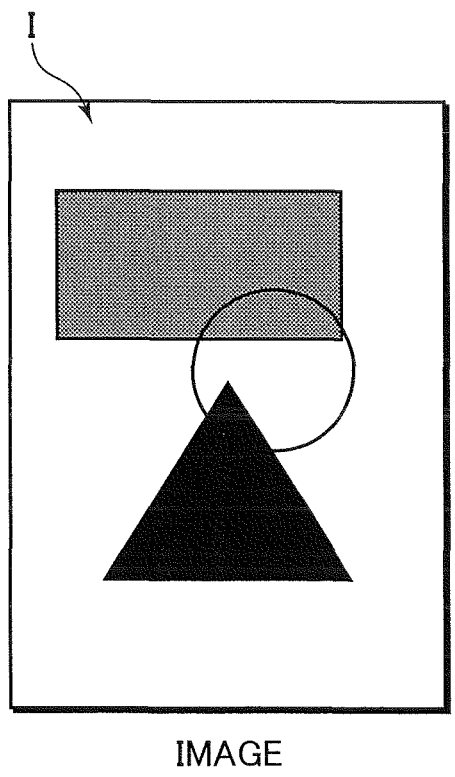
FIG. 6A schematically shows an example of an image of a print job.

Next, the controller 3 executes a control of allowing the band data generating section 2 to generate band data divided into square blocks (step S6). For example, in the case of the image 1 of a print job shown in FIG. 6A, the band data generating section 2 generates band data for each of square blocks A11 through A86 in such a manner as shown in FIG. 6B.

Figure 6B:
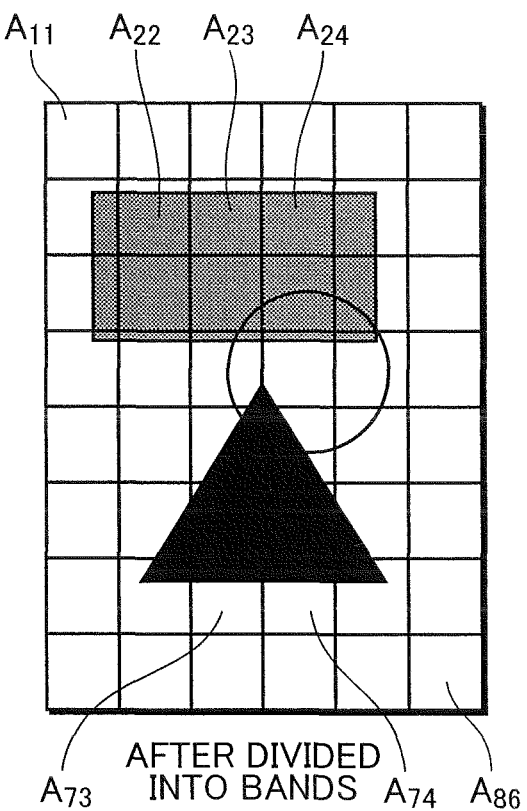
FIG. 6B schematically shows an example of a state where the image of the print job is divided into band data.

Herein, for example, a block A22, a block A23, and a block A24 shown in FIG. 6B are the same band data, and a block A73 and a block A74 are also the same band data. Therefore, the print image producing section 5 repeatedly uses band data of the block A22 as band data of the block A23 and the block A24, and repeatedly uses band data of the block A73 as band data of the block A74. This shortens a processing time necessary for the producing processing of a print image in the image forming apparatus 10.

Therefore, although the controller 3 of the image forming apparatus 10 normally allows the band data generating section 2 to compress bit image data and store the same into the storage section 4 in the generating control of band data in step S6, the controller 3 makes determination with respect to band data generated in divided blocks as described above whether or not current band data subjected to a processing of newly compressing bit image data (for example, the block A23) is same as previous band data (for example, the block A22). When the controller 3 determines that the new band data is the same data as that of the previous band data, it allows the band data generating section 2 not to perform a compression processing of bit image data and a storing processing of the band data to the storage section 4, and allows repeating use instruction information indicating repeating use of band data to be stored in the storage section 4.

Then, the controller 3 executes determination on presence or absence of a sheet error, in other words, determines whether or not sheet specifying information obtained from a print job matches with sheet detection information obtained from the sheet detecting section 7 (step S7). When the determination result is YES, in other words, the sheet specifying information obtained from the print job matches with sheet detection information obtained from the sheet detecting section 7, the routine proceeds to a processing of step S12.

Further, when the determination result in the determination processing of step S7 is NO, in other words, the sheet specifying information obtained from the print job is "sheet error" indicating non-matching with respect to the sheet detection information obtained from the sheet detecting section 7, the controller 3 determines whether a sheet whose widthwise and lengthwise directions are inversed is set (step S8).

Then, when the determination result of the determination processing in step S8 is NO, in other words, a sheet whose widthwise and lengthwise directions are inversed is not set (in other words, neither a sheet whose direction is matching with a direction of the generated bit image data nor a sheet whose direction is not matching with the direction of the generated bit image data is set), the controller 3 allows a message which notifies setting of a sheet whose widthwise and lengthwise directions are matching to be displayed on an unillustrated display portion (step S9).

Further, when the controller 3 determines presence or absence of a printing start instruction inputted by a user through an unillustrated operation input section (step S10), and the determination result is YES, in other words, when a user instructs restarting of printing by inputting the printing restart instruction, the controller 3 allows the routine to proceed to step S12. This is because it is considered that a user sets a sheet whose widthwise and lengthwise directions are matching. On the other hand, when the determination result of step S10 is NO, in other words, the printing restart instruction is not inputted by a user, and the restarting of printing is denied, the printing processing of the print job is terminated, and the routine proceeds to step S14.

Further, when the determination result in determination processing in step S8 is YES, in other words, a sheet whose widthwise and lengthwise directions are inversed is set (in other words, when a sheet whose widthwise and lengthwise directions are inversed is set even while a direction of the generated bit image data and a direction of a set sheet are inversed), the controller 3 performs a processing of rotating band data by 90 degrees (step S11).

Then, the controller 3 performs a control of producing a print image for one page based on each band data by the printing section 6 (step S12). The print image producing section 5 which produces a print image from band data stored and accumulated in the storage section 4 normally (in other words, in the case where the repeating use instruction information is not stored in the storage section 4) applies an expansion processing to bit image data compressed and stored in the storage section 4 to expand the same in a buffer. However, when the repeating use instruction information is stored in the storage section 4, the print image producing section 5 uses the bit image data, which is expanded from previous band data, directly as a print image without performing the expansion processing and transfers previously used bit image data stored in a buffer of the print image producing section 5 (bit image data to which the expansion processing is already applied) to the printing section 6. Further, the controller 3 determines whether or not printing is terminated for all pages (step S13).

When the determination result in the determination processing in step S13 is NO, in other words, a page which should be printed still remains, the routine goes back to step S7, so that the processing of steps S7 through step S13 are performed repeatedly. When the determination result of the determination processing in the step S13 is YES, in other words, when printing of all pages of the print job is terminated, the controller 3 determines presence or absence of a next print job (step S14).

When the determination result of the determination processing in step S14 is YES, in other words, when a next print job is given, the routine goes back to step S1, and the processing of step S1 through step S14 are repeatedly performed, so that the next print job is executed. Further, when the determination result of the determination processing in step S14 is NO, in other words, when the next job is not given, the processing is terminated.

As described above, the image forming apparatus 10 includes the band data generating section 2 for generating image data of each page of a print job as band data including divisions each having a predetermined size, the storage section 4 for storing the band data, the print image producing section 5 for producing a print image from the band data stored in the storage section 4, a printing section 6 for printing the print image produced by the print image producing section 5, a controller 3 for controlling the band data generating of the band data generating section 2, the band data storing of the storage section, the print image producing of the print image producing section 5, and the sheet printing of the printing section 6.

The controller 3 executes a control of allowing the storage section 4 to store repeating use instruction information indicating that previous band data is to be repeatedly used when the band data to be stored in the storage section 4 is same as previous data. Then, the controller 3 allows the print image producing section 5 to produce a print image by repeatedly using data expanded from the previous band data as data expanded from band data associated with the repeating use instruction information (in other words, band data which is newly generated and subjected to generating of bit image data).

As described above, in this image forming apparatus 10, when the band data newly generated from the image data is identical to the previous band data, the band data generating section 2 does not perform a processing of compressing bit image data and storing the same in the storage section 4 with respect to the new band data, and the print image producing section 5 produces a print image with use of previous bit image data to which an expanding processing is already applied as data expanded from new band data.

Further, in the image forming apparatus 10, band data is divided into square blocks. Accordingly, a time for comparing whether the band data is same as previous band can be shortened, and possibility that the data are the same becomes high. Further, since bit image data compression processing and expansion processing (expanding processing) with respect to band data can be abbreviated, and previous bit image data can be directly used, a processing time can be shortened. Further, since the expanding processing becomes unnecessary, compression processing and expanding processing with respect to next band data can be performed quickly, so that a print-overrun can be prevented.

In summary, the present invention includes: a band data generating section for generating image data of each page of a print job as band data, the band data including divisions each having a predetermined size; a print image producing section for producing a print image from the band data stored in the storage section; a printing section for printing the print image produced by the print image producing section onto a sheet; a controller for controlling the band data generating of the band data generating section, the band data storing of the storage section, the print image producing of the print image producing section, and the printing of the printing section, wherein the controller allows the storage section to store repeating use instruction information indicating that previous band data is to be repeatedly used in place of newly generated band data when the newly generated band data of the image data is identical to the previous band data stored in the storage section, and the controller allows the image producing section to produce a print image by using expanded data of previous band data in place of expanded data of band associated with the repeating use instruction information stored in the storage section.

According to this invention, when the band data newly generated from the image data is identical to the previous band data, the controller allows the storage section to store repeating use instruction information indicating that previous band data is to be repeatedly used in place of newly generated band data, and the controller allows the image producing section to produce a print image from the previous data, which is already expanded, as data expanded from the newly generated band data. Accordingly, a size of software necessary for the printing processing is made small while a speed of the processing is made higher as compared to that of the conventional manner, so that the amount of memory necessary for the printing processing can be reduced.

Further, according to the present invention, the band data is data of a square block.

Further, according to the present invention, the band data is a bit map image data.

Further, according to the present invention, the band data generating section generates the band data by compressing bit map image data, the print image producing section produces a print image by expanding the compressed bit map image data stored in the storage section, and the controller allows the band data generating section not to perform the band data generating by compressing the bit map image data and allows the print image producing section to produce a print image from previous bit image data to which the expanding processing is already applied as data expanded from the previous band data associated with the repeating use instruction information when the repeating use instruction information is stored in the storage section.

Further, the present invention includes a computer-readable recording medium storing an image forming program which allows a computer provided in an image forming apparatus to function so as to execute a processing of allowing a printing section to print image data generated from each page of a print job, the image forming program renders the computer to serve as: a band data generating section for generating image data of each page of a print job as band data, the band data including divisions each having a predetermined size; a storage section for storing the band data; a print image producing section for producing a print image from the band data stored in the storage section; a printing section for printing the print image produced by the print image producing section onto a sheet; a controller for controlling the band data generating of the band data generating section, the band data storing of the storage section, the print image producing of the print image producing section, and the printing of the printing section. The image forming program further renders the computer to function so that: the controller allows the storage section to store repeating use instruction information indicating that previous band data is to be repeatedly used in place of newly generated band data when the newly generated band data of the image data is identical to the previous band data stored in the storage section, and the controller allows the image producing section to produce a print image by using expanded data of previous band data in place of expanded data of band associated with the repeating use instruction information stored in the storage section.

Further, the present invention includes a computer-readable recording medium storing the image forming program which renders the computer to process the band data as data of a square block.

Further, the present invention includes a computer-readable recording medium storing the image forming program which renders the computer to process the band data as a bit map image data.

Further, the present invention includes a computer-readable recording medium storing the image forming program which renders the computer to function so that: the band data generating section generates the band data by compressing bit map image data, the print image producing section produces a print image by expanding the compressed bit map image data stored in the storage section, and the controller allows the band data generating section not to perform the band data generating by compressing the bit map image data and allows the print image producing section to produce a print image from previous bit image data to which the expanding processing is already applied as data expanded from the previous band data associated with the repeating use instruction information when the repeating use instruction information is stored in the storage section.

This application is based on Japanese Patent application serial No. 2007-047418 filed in Japan Patent Office on Feb. 27, 2007, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image forming apparatus comprising:
   a band data generating section for generating image data of each page of a print job as band data, the band data including divisions each having a predetermined size;
   a storage section for storing each of the band data consisting of the image data as a compressed bit map image data;
   a print image producing section for producing a print image from the band data stored in the storage section;
   a printing section for printing the print image produced by the print image producing section onto a sheet;
   a controller for controlling the band data generating of the band data generating section, the band data storing of the storage section, the print image producing of the print image producing section, and the printing of the printing section, wherein
   the controller allows the storage section to store repeating use instruction information indicating that previous band data is to be repeatedly used in place of allowing newly generated band data to become the compressed bit map image data that is stored in the storage section if the newly generated band data of the image data is identical to the previous band data that is stored in the storage section and is continuous with the newly generated band data when the controller allows the storage section to store each of the band data consisting of the image data to become the compressed bit map image data,
   the print image producing section produces a print image by expanding the compressed bit map image data stored in the storage section, and
   the controller (a) allows the print image producing section to produce a print image by expanding the compressed bit map image data when the repeating use instruction information is not stored in the storage section and (b) allows the print image producing section not to perform the expanding processing, but to produce the print image from the bit image data associated with the previous band data to which the expanding processing already is applied when the repeating use instruction information is stored in the storage section.

2. The image forming apparatus according to claim 1, wherein the band data is data of a square block.

3. A computer-readable non-transitory recording medium storing an image forming program which allows a computer provided in an image forming apparatus to function so as to execute a processing of allowing a printing section to print image data generated from each page of a print job, the image forming program renders the computer to serve as:
   a band data generating section for generating image data of each page of a print job as band data, the band data including divisions each having a predetermined size;

a storage section for storing each of the band data consisting of the image data as a compressed bit map image data;

a print image producing section for producing a print image from the band data stored in the storage section;

a printing section for printing the print image produced by the print image producing section onto a sheet;

a controller for controlling the band data generating of the band data generating section, the band data storing of the storage section, the print image producing of the print image producing section, and the printing of the printing section, wherein the image forming program further renders the computer to function so that:

the controller allows the storage section to store repeating use instruction information indicating that previous band data is to be repeatedly used in place of allowing newly generated band data to become the compressed bit map image data that is stored in the storage section if the newly generated band data of the image data is identical to the previous band data that is stored in the storage section and is continuous with the newly generated band data when the controller allows the storage section to store each of the band data consisting of the image data to become the compressed bit map image data, the print image producing section produces a print image by expanding the map image data stored in the storage section, and the controller (a) allows the print image producing section to produce a print image by expanding the compressed this map image data when the repeating use instruction information is not stored in the storage section and (b) allows the print image producing section not to perform the expanding processing, but to produce the print image from the bit image data associated with the previous band data to which the expanding processing already is applied when the repeating use instruction information is stored in the storage section.

4. The computer-readable recording medium storing the image forming program according to claim 3, wherein the image forming program renders the computer to process the band data as data of a square block.

* * * * *